Feb. 13, 1934.    R. E. DUNHAM    1,947,127
TILLAGE COMBINE
Filed March 23, 1931
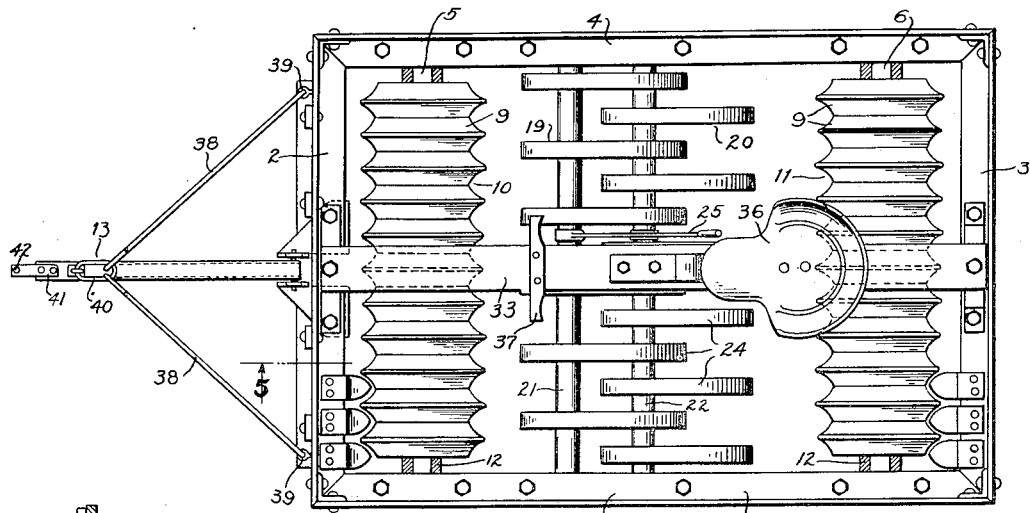
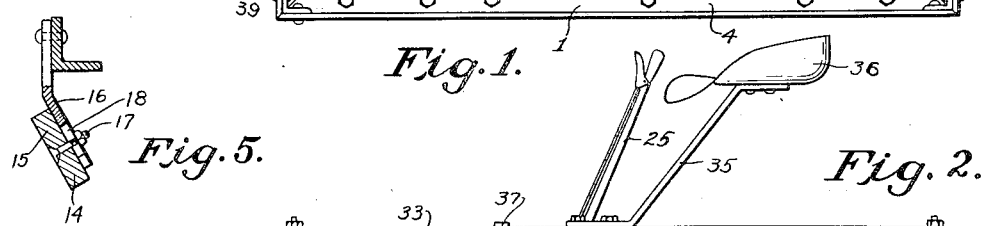
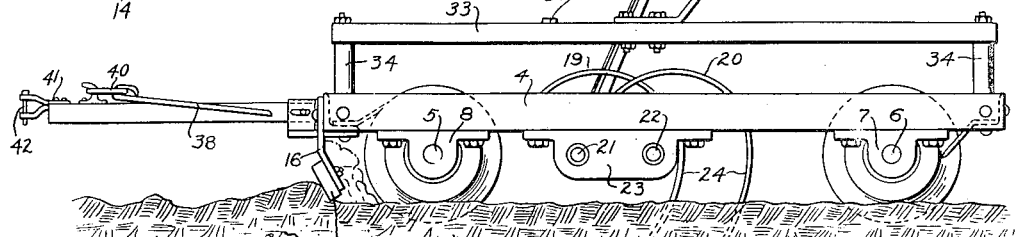
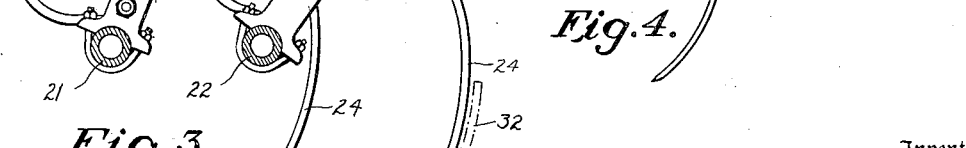
Inventor
Ray E. Dunham.
Stough & Canfield
Attorneys Patented Feb. 13, 1934

1,947,127

UNITED STATES PATENT OFFICE 1,947,127

TILLAGE COMBINE

Ray E. Dunham, Berea, Ohio, assignor, by mesne assignments, to The Dunham Company, Berea, Ohio, a corporation of Ohio (1931)

Application March 23, 1931. Serial No. 524,723

3 Claims. (Cl. 55—12)

This invention relates to agricultural implements and particularly to agricultural tillage implements for preparing the soil for seeding.

It has for many years been the recognized practice, in preparing ground for seeding; to first plow the soil, then to perform various operations thereon such as harrowing, rolling, packing, dragging and the like, to reduce the plowed soil to a compact finely broken condition preferably with moisture conserving mulch on the surface.

It is an object of this invention to provide a tillage implement whereby the soil may be prepared for a seed bed as described by a single pressage of the implement over the ground.

Another object is to provide a tillage implement of the class referred to whereby the ground may be worked to a substantially uniform depth regardless of differences in the hardness and texture of the soil in different parts of the field.

Another object is to provide, in an implement of the class described, improved means for adjusting the depth to which the soil is worked by the implement.

Other objects will be apparent to those skilled in the art to which my invention appertains.

My invention is fully disclosed in the following description taken in connection with the accompanying drawing, in which:

Fig. 1 is a top plan view of an implement embodying my invention, the parts being shown in simplified form and some of the minor parts being omitted for simplicity.

Fig. 2 is a side elevational view of the implement of Fig. 1;

Fig. 3 is a view to an enlarged scale of a part of the implement of Figs. 1 and 2, showing a mechanism for rockingly elevating and depressing ground-working tools which I may employ;

Fig. 4 is a detail view of a spring tooth mounting which I may employ;

Fig. 5 is a sectional fragmentary view taken approximately from the plane 5—5 of Fig. 1 and to an enlarged scale and illustrating an adjustment feature which I may employ.

Referring to the drawing, Fig. 1, I have shown at 1 a rectangular frame, preferably constructed from the angle iron and comprising front and rear end members 2 and 3 and side members 4—4. In the forward and rearward ends of these side members 4—4 of the frame are mounted shafts 5 and 6 in suitable supports 7 and 8 bolted to the side members 4—4. Upon the shafts 5 and 6 are mounted gangs of discs 9—9, the gangs being indicated generally at 10 and 11.

The discs 9—9 have peripheries generally V-shaped in cross-section and are rotatably mounted on the shafts 5 and 6. Discs of this general construction and the operations which they perform are believed to be generally well known and understood in this art, and although the operations which they perform in the present invention are in some respects different from those which they have heretofore performed, it is believed that no further description herein is necessary.

While the discs 9—9 freely individually rotate on the shafts 5—6, they are prevented from axially shifting by suitable blocks 12—12 which may be disposed on the shafts 5 and 6 between the outermost or end discs and the shaft supports 7 and 8 above described.

The frame 1 is supported by the disc gangs 10 and 11 and by means of a suitable hitch indicated generally at 13, the implement thus far described may be propelled along the ground, the discs functioning as supporting wheels for the frame.

On the forward end 2 of the frame, a drag bar 14 is provided, preferably comprising a transversely disposed strip of metal 15 supported below the frame by hangers 16—16 connected to the strip and to the frame. Preferably the lower edge of the strip 15 is positioned above the lower edge of the disc 9.

The strip 15 is bolted to the hangers 16 by bolts 17 projected through the strip and through suitable slots 18 in the hangers 16 whereby the vertical position of the strip relative to the ground or relative to the lower edge of the discs 9 may be adjusted in a well known manner.

Between the two gangs 10 and 11 of discs, two gangs of spring type harrow teeth indicated generally at 19 and 20 are provided, mounted respectively on a pair of shafts 21 and 22 extending transversely of the frame 1 and rotatably supported in bearings 23—23 on the side frame members 4—4. On each of the shafts 21 and 22 is secured a plurality of harrow teeth 24—24, the preferred mounting therefor being illustrated in Fig. 4 for the shaft 21.

The spring teeth 24 and the mounting therefor may be those well known in the art. It is only essential that the inner or non-yielding ends of the spring teeth be rigidly connected to the shafts 21 and 22 and that the free or resilient ends of the teeth be relatively stiff, that is to say, resilient but yielding only when encountering relatively hard portions of soil when drawn through the ground, in a manner to be described.

All of the teeth 24—24 of the two gangs 19 and 20 are adapted to be revolved around the axes of the shafts 21 and 22 to raise them out of the ground or to thrust them into the ground by the following mechanism.

An operating lever 25 is rigidly connected to the shaft 21, and a short lever arm 26 is rigidly connected to the shaft 22, the arm and lever being connected by a bar 27 upon which is secured a toothed sector 28. The bar 27 may be adjustably connected to the arm 26 by adjusting bolt holes 29 in a well known manner. A dog 30 may be operatively moved to engage one or the other of the teeth 28.

The lever 25 may be rocked around the axis of the shaft 21 to turn that shaft and will concurrently rock the shaft 22 through the bar 27 and arm 26 and will correspondingly rock the two gangs of spring teeth to raise them entirely out of the ground or to thrust them into the ground to predetermined depths determined by the sector teeth 28. By means of the adjusting holes 29, the teeth on the shaft 22 may be adjusted to a greater depth than the teeth on the shaft 21. For example, for a given adjusted position for the teeth of the forward gang, as illustrated in Fig. 3, the teeth of the rearward gang may have such adjusted depth positions as that indicated at 31 in solid line and at 32 in broken line.

A channel bar 33, disposed longitudinally of the frame 1, may be supported on the end members 2 and 3 thereof by upwardly extending supports 34—34 and on the bar the standard 35 of a seat 36 may be supported; and a foot rest 37 may likewise be mounted on the bar 33.

The shafts 5 and 6 as well as the shafts 21 and 22 may be fixed against longitudinal shifting in their supports 7, 8 and 23, respectively, by any suitable well known means.

While spring teeth 24—24 of known form may be employed, it is desirable that the ground-working end portions of the spring teeth be shaped so that when they are rocked by the lever so as to thrust them into the soil, they will slope upwardly rearwardly so that when propelled through the soil forwardly they will plow or turn over the soil and lift to the surface clods and the like.

The hitch 13 may be of any suitable or known construction whereby the implement may be forwardly propelled by tractive power such as that of a tractor and whereby the forward ends thereof may rise and fall while being propelled to follow irregularities of the ground. The hitch illustrated in Figs. 1 and 2 comprises drag bars 38—38 rearwardly hingedly connected at 39—39 to the forward frame member 2, and converging forwardly are joined by a link 40 connected to a tongue 41 having on its forward end a pin 42 by which the connection to the tractor may be made.

In the operation of my invention, as the implement is pulled over the surface of the soil, the drag bar 15 functions to level off ridges, furrows and the like to render the surface approximately level. The drag bar is followed immediately by the gang of discs 10 which operates thereon in the known manner of discs of this type to crush, pulverize and generally break up the surface of the soil to a relatively shallow depth. This operation is immediately followed by the spring teeth, set to the desired depth, and which plow up the soil to a greater depth, raising to the surface clods and lumps. The spring tooth operation is substantially a plowing operation, elevating and turning the soil to substantially a uniform depth. The soil crushed by the disc gang is sifted down into the coarsely broken soil left by the spring teeth. The unbroken clods and the like are left on the surface. The rear gang immediately follows and pulverizes the clods and lumps raised by the teeth and left on or near the surface; and leaves the soil completely mulched and packed substantially to the full working depth of the spring teeth.

I find that by the employment of an implement embodying my invention, the several separate operations of discing, harrowing, packing, rolling, dragging, and the like, heretofore usually performed to prepare the seed bed after plowing, may be entirely omitted, and particularly where the soil has been worked during the preceding year, the traditionally necessary initial plowing operation may be omitted.

Where it is necessary to plow the ground with a plow, as for example where a heavy growth of sod is established, the ground so plowed may be reduced to a finished seed bed as is the unplowed ground worked the previous year, by a single passage thereover of the implement.

The gangs of discs 10 and 11 are preferably very heavy, a suitable number of discs for example weighting 500 pounds or more per gang, and the spring teeth are thereby held in the ground to the desired depth and in a manner greatly superior to that when a spring tooth harrow of prior construction is employed alone as in prior practice. The peripheral shape of the discs interlocks them with the soil in a manner to prevent lateral shifting thereof, so that the spring teeth are furthermore prevented from shifting or skidding or jumping laterally upon encountering hard or uneven soil below the surface. The spring teeth being preferably chosen to be relatively stiff, these objectionable movements in the operation of harrow teeth as usually employed, that is the resilient spring or jumping upwardly and skidding laterally in the ground, are thus reduced to a negligible minimum.

The operation performed by the spring teeth is superior to and hardly comparable with that performed by similar teeth in known types of spring tooth harrow.

A more effective working of the soil by spring teeth of the type described hereinbefore and employed in an implement embodying my invention as above described, is evidenced in a collateral manner by the fact that it requires substantially twice as much draw bar pull to propel a given number of teeth through the soil as is required in prior spring tooth harrows; and by the fact that the teeth wear away much more rapidly than in prior practice and has, I find, rendered it necessary to provide teeth of especially hard alloys such for example as vanadium steel to provide a suitable length of life therefor.

In other words, by employing relatively stiff spring teeth and by holding them down to their work by the weight of the implement as a whole including the heavy gangs of discs, and by preventing the lateral shifting of the frame and the spring teeth by the interlocked engagement of the V-shaped peripheries of the disc with the soil, a novel mode of operation of the spring teeth which I employ is effected. When this is combined with the action of the discs preceding and following the spring teeth, soil may be prepared for seeding to substantially a uniform depth and by one passage of the implement over the ground in an improved manner.

Changes and modifications may be made in the embodiment of my invention illustrated and described without departing from the scope and spirit of my invention. For example, other means other than that illustrated and described may be employed to elevate and depress the gangs of teeth and discs having variations in the peripheries thereof may be employed, and my invention comprehends all such modifications and changes.

I claim:

1. In a tillage implement for plowing and pulverizing soil to a substantially uniform predetermined depth, a main frame comprising laterally spaced side portions and forwardly and rearwardly spaced end portions, a pair of forwardly and rearwardly spaced rigid parallel shaft elements disposed transversely of the frame and connected at opposite end portions to the frame side portions, a gang of ground-engaging discs having peripheries generally of V-shape in cross-section on each shaft element, the discs being independently rotatably mounted upon the shaft elements and supporting the frame above the ground, a rigid transverse bar element disposed between the disc gangs and supported at opposite ends upon the frame above the ground, a gang of plowing tools secured to and supported on the bar element comprising each a body portion slightly rearwardly resiliently yieldable, connected to the bar element, and comprising pointed ground penetrating and plowing portions, operable means for moving the bar element to adjustably move the tools to dispose their several pointed portions at a uniform predetermined depth in the ground or to raise them out of the ground, the frame side and end portions being rigidly united in a non-warpable non-yielding rigid unitary frame, and the weight of the frame, frame-supported parts, shaft elements and discs depressing the V-shaped peripheries of the discs into interlocked relation with the ground to prevent lateral shifting thereof and lateral shifting of the frame and of the plowing tools, and holding the tool pointed portions at substantially a constant depth in the soil against the tendency to be pushed out of the soil or laterally in the soil upon encountering hard portions thereof, to effect breaking, turning and pulverizing of a soil layer of substantially uniform thickness leaving unbroken the solid earth thereunder.

2. A tillage implement as described in claim 1 and in which a plurality of gangs of similar plowing tools similarly supported is employed, the plowing tools on one bar element disposed in transversely staggered relation to those upon another adjacent bar element.

3. A tillage implement as described in claim 1 and in which a leveling bar is provided, rigidly connected to the rigid frame and on a front portion thereof to level off irregularities of the ground surface to further insure that the layer of pulverized soil produced by the implement in passing over the ground will be of substantially uniform depth.

RAY E. DUNHAM.